(12) United States Patent
Sakai et al.

(10) Patent No.: US 11,748,226 B2
(45) Date of Patent: Sep. 5, 2023

(54) SERVICE GRAPH GENERATOR, SERVICE GRAPH GENERATION METHOD, AND PROGRAM

(71) Applicant: Nippon Telegraph and Telephone Corporation, Tokyo (JP)

(72) Inventors: Masaru Sakai, Musashino (JP); Satoshi Kondo, Musashino (JP); Kensuke Takahashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/801,090

(22) PCT Filed: Feb. 19, 2020

(86) PCT No.: PCT/JP2020/006513
§ 371 (c)(1),
(2) Date: Aug. 19, 2022

(87) PCT Pub. No.: WO2021/166118
PCT Pub. Date: Aug. 26, 2021

(65) Prior Publication Data
US 2023/0082956 A1    Mar. 16, 2023

(51) Int. Cl.
*G06F 9/44* (2018.01)
*G06F 11/32* (2006.01)
*G06F 11/30* (2006.01)

(52) U.S. Cl.
CPC ........ *G06F 11/323* (2013.01); *G06F 11/3068* (2013.01)

(58) Field of Classification Search
None
See application file for complete search history.

(56) References Cited

U.S. PATENT DOCUMENTS 10,216,608 B1 *   2/2019   Arguelles ............ G06F 11/3612
11,030,068 B1 *   6/2021   Agarwal ............... G06F 11/323
(Continued)

FOREIGN PATENT DOCUMENTS

| JP | 2000259589 | 9/2000 |
| JP | 2002215703 | 8/2002 |
| JP | 2013050950 | 3/2013 |

OTHER PUBLICATIONS

[No Author Listed] [online], "Jaeger: open source, end-to-end distributed tracing," Jaeger, Dec. 16, 2019, retrieved from URL <https://www.jaegertracing.io/>, 8 pages.

*Primary Examiner* — Qamrun Nahar
(74) *Attorney, Agent, or Firm* — Fish & Richardson P.C.

(57) ABSTRACT

Provided is a service graph generation apparatus 10 for generating a service graph expressing a dependency relationship between components constituting a monitoring target service 50. The service graph generation apparatus 10 includes an acquisition unit 11 that acquires trace data including spans recording a parent-child relationship and time data of processing of components in a series of processing in a service, an analysis unit 13 that compares, for every piece of the trace data, time data between spans of the components having the same parent to estimate an order relationship or an exclusive relationship between the components, and a creation unit 14 that creates a service graph expressing all components formed of the monitoring target service 50, and the parent-child relationship, the order relationship, and the exclusive relationship between the components.

9 Claims, 13 Drawing Sheets

(56) References Cited

U.S. PATENT DOCUMENTS

| | | | |
|---|---|---|---|
| 11,194,688 B1* | 12/2021 | Featonby | G06F 11/323 |
| 11,314,601 B1* | 4/2022 | Natanzon | G06F 11/3466 |
| 11,347,625 B1* | 5/2022 | Agarwal | G06F 11/323 |
| 2004/0230980 A1 | 11/2004 | Koyama et al. | |
| 2013/0046779 A1* | 2/2013 | Gagliardi | G06F 11/3612 |
| | | | 707/769 |

* cited by examiner

SERVICE GRAPH GENERATOR, SERVICE GRAPH GENERATION METHOD, AND PROGRAM

CROSS-REFERENCE TO RELATED APPLICATIONS

This application is a National Stage application under 35 U.S.C. § 371 of International Application No. PCT/JP2020/006513, having an International Filing Date of Feb. 19, 2020, the disclosure of which is considered part of the disclosure of this application, and is incorporated by reference in its entirety into this application.

TECHNICAL FIELD

The present invention relates to a service graph generation apparatus, a service graph generation method, and a program.

BACKGROUND ART

Microservice architectures are widespread. In the microservice architectures, network services such as a web service and an ICT service each serving as components are functionally divided and the components communicate with each other to operate serially.

In NPL 1, a tracing technique is proposed in which a code for carrying a label is embedded in each component of a service to visualize a flow of a series of operations in a microservice. According to the technique of NPL 1, it is possible to obtain a service topology in which a parent-child relationship between components is visualized based on collected information.

CITATION LIST

Non Patent Literature

NPL 1: "Jaeger: open source, end-to-end distributed tracing", [online], Internet <URL: https://www.jaegertracing.io/>

SUMMARY OF THE INVENTION

Technical Problem

However, in NPL 1, it is not possible to obtain a dependency relationship including an order relationship and an exclusive relationship between components. The service topology visualized by the technique of NPL 1 can express a parent-child relationship between components, but fails to express characteristics of an operation flow of the components, including an order relationship and an exclusive relationship between the components.

If it is possible to understand not only the parent-child relationship between the components, but also the dependency relationship including the order relationship and the exclusive relationship between the components, it is easy to identify a location of a root cause and a failure range when a service failure occurs.

The present invention has been contrived in view of the above circumstances, and an object of the present invention is to facilitate identification of a location of a root cause and a failure range when a service failure occurs.

Means for Solving the Problem

A service graph generation apparatus according to one aspect of the present invention is a service graph generation apparatus for generating a service graph expressing a dependency relationship between components constituting a service, and the service graph generation apparatus includes an acquisition unit that acquires trace data including spans recording a parent-child relationship and time data of processing of the components in a series of processing in the service, an analysis unit that compares, for every piece of the trace data, time data between spans of the components having an identical parent to estimate an order relationship or an exclusive relationship between the components, and a creation unit that creates a service graph expressing all of the components constituting the service, and the parent-child relationship, the order relationship, and the exclusive relationship between the components.

Effects of the Invention

According to the present invention, it is possible to facilitate identification of a location of a root cause and a failure range when a service failure occurs.

DESCRIPTION OF EMBODIMENTS

An embodiment of the present invention will be described below with reference to the drawings.

Figure 1:
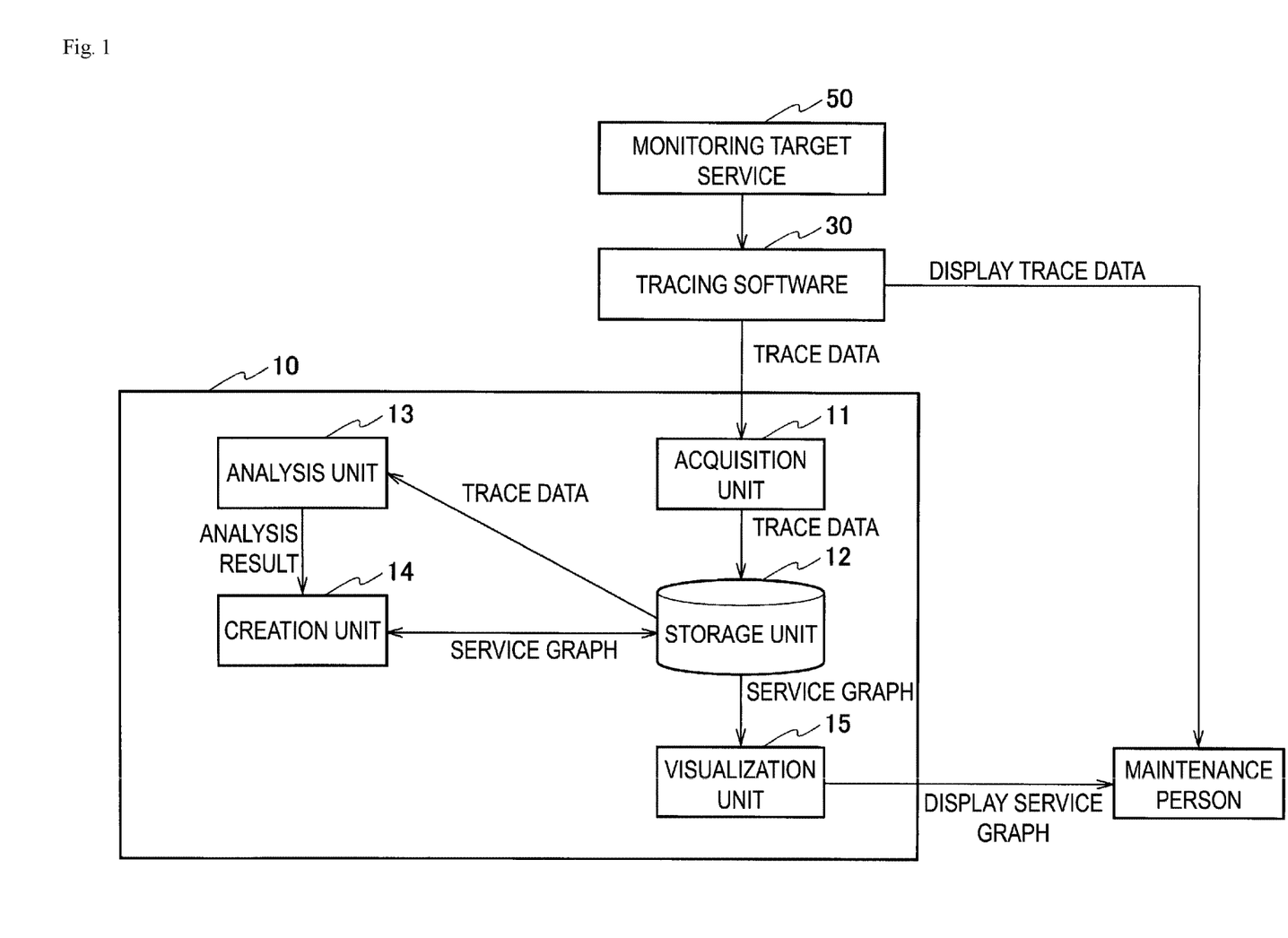
FIG. 1 is a diagram illustrating an example of an overall configuration of a maintenance management system including a service graph generation apparatus according to the present embodiment.

An overall configuration of a maintenance management system including a service graph generation apparatus 10 according to the present embodiment will be described with reference to FIG. 1. The maintenance management system illustrated in FIG. 1 includes the service graph generation apparatus 10 and a tracing software 30.

A monitoring target service 50 includes a plurality of components, and the plurality of components operate serially to realize a certain function. Each of the components includes an interface through which a request and a response are transmitted and received to and from another components and is a program implemented in various types of programming languages.

The tracing software 30 records processing in each of the components of the monitoring target service 50 in the form of a span, and visualizes a flow of a series of operations of the monitoring target service 50 as a trace. A code for carrying a label is embedded in each of the components of the monitoring target service 50, so that the span can be acquired. The technique of NPL 1 may be utilized for the tracing software 30. The tracing software 30 is operated on a virtual server or a physical server to acquire data obtained by tracing operations of the monitoring target service 50.

Figure 2:
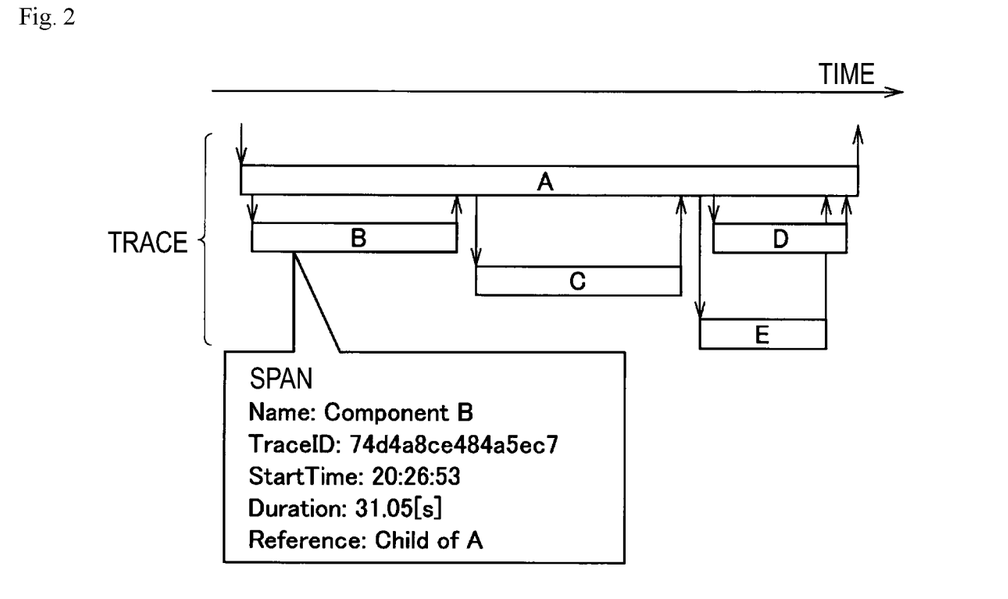
FIG. 2 is a diagram illustrating an example of visualized trace data.

A trace is a group of spans including a series of processing of from a request to a response for the monitoring target service 50. For example, one piece of trace data expressing processing of from one request by an end user to the monitoring target service 50 to a response is obtained. Each of the spans is data recording time data of processing and a parent-child relationship of each component. FIG. 2 illustrates an example of visualized trace data. The five rectangles represent spans of components A to E. In FIG. 2, the horizontal axis expresses a time period and a processing period of the components is expressed by a width of each of the rectangles. Arrows indicate transmission and reception of a request and a response between the component A and the components B to E. Each of the spans includes, for example, information including a name (Name), a trace ID (TraceID), a processing start time (StartTime), a processing time period (Duration), and a relationship (Reference) of the components A to E.

Figure 3:
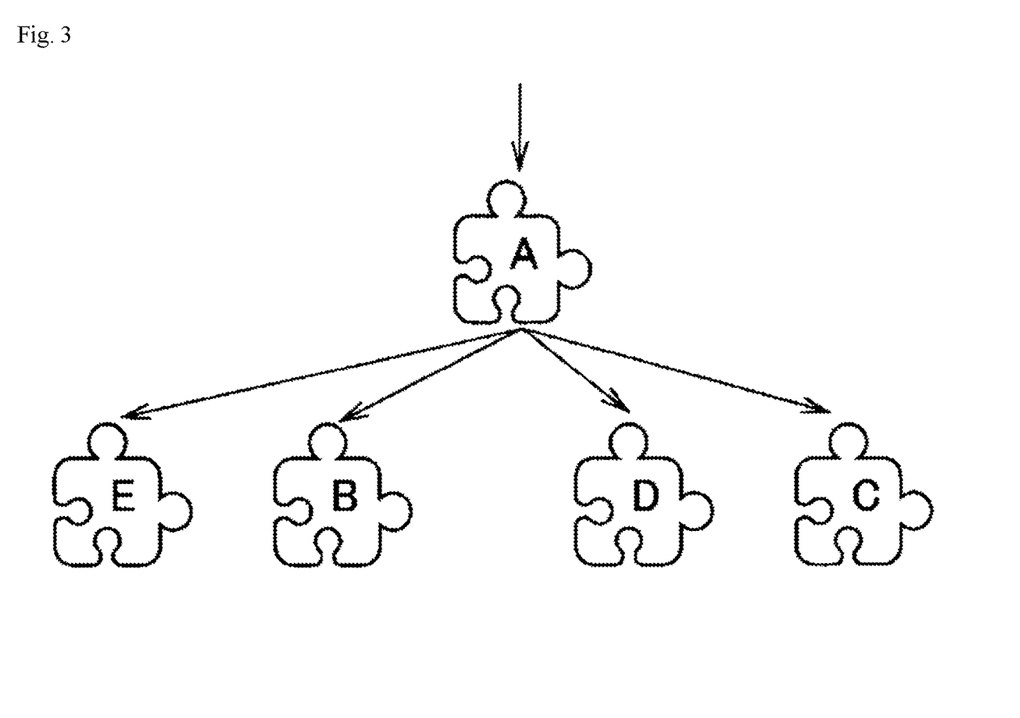
FIG. 3 is a diagram illustrating an example of a visualized service topology.

The tracing software 30 visualizes a service topology from a parent-child relationship included in the span. FIG. 3 illustrates an example of the visualized service topology. FIG. 3 illustrates an example where the four components B to E have the component A as a parent. That is, each of the components B to E receives a request from the component A, processes the request, and transmits a response.

The service graph generation apparatus 10 acquires trace data from the tracing software 30 and estimates an order relationship and an exclusive relationship of the components B to E having a sibling relationship. The service graph generation apparatus 10 generates a service graph expressing a dependency relationship among the components constituting the monitoring target service 50. For example, in one example of the dependency relationship, if the component D is always executed after the processing of component B, it can be said that the component B and the component D are in an order relationship. If the component D utilizes information acquired from the component B, the component D is always executed after the processing of component B. Further, in another example of the dependency relationship, if the processing of the component B and the processing of the component C are not executed in parallel, it can be said that the component B and the component C are in an exclusive relationship. If the component B and the component C issue instructions to the same apparatus, the processing of the component B and the processing of the component C are not executed in parallel to prevent an error.

In the service topology visualized by the tracing software 30, the parent-child relationship between the component A and the components B to E is known, but it is not possible to know the order relationship between the components B, C, D, and E and the exclusive relationship between the components B, C, D, and E. Thus, the service graph generation apparatus 10 generates a service graph expressing a dependency relationship including the order relationship and the exclusive relationship between the components and presents the generated service graph to a maintenance person. Each component of the service graph generation apparatus 10 will be described below.

The service graph generation apparatus 10 includes an acquisition unit 11, a storage unit 12, an analysis unit 13, a creation unit 14, and a visualization unit 15.

The acquisition unit 11 acquires trace data from the tracing software 30 and stores the trace data in the storage unit 12.

The storage unit 12 stores the trace data and a service graph generated by the creation unit 14.

The analysis unit 13 analyzes the trace data to estimate an order relationship and an exclusive relationship between the components.

The creation unit 14 generates or updates the service graph, based on the analysis result of the analysis unit 13, and stores the generated or updated service graph in the storage unit 12.

The visualization unit 15 visualizes the service graph generated by the creation unit 14 and presents the visualized service graph to the maintenance person.

The maintenance person refers to the service topology and the trace data presented by the tracing software 30 and the service graph presented by the service graph generation apparatus 10 to identify a location of a root cause and a failure range of the monitoring target service 50.

Figure 4:
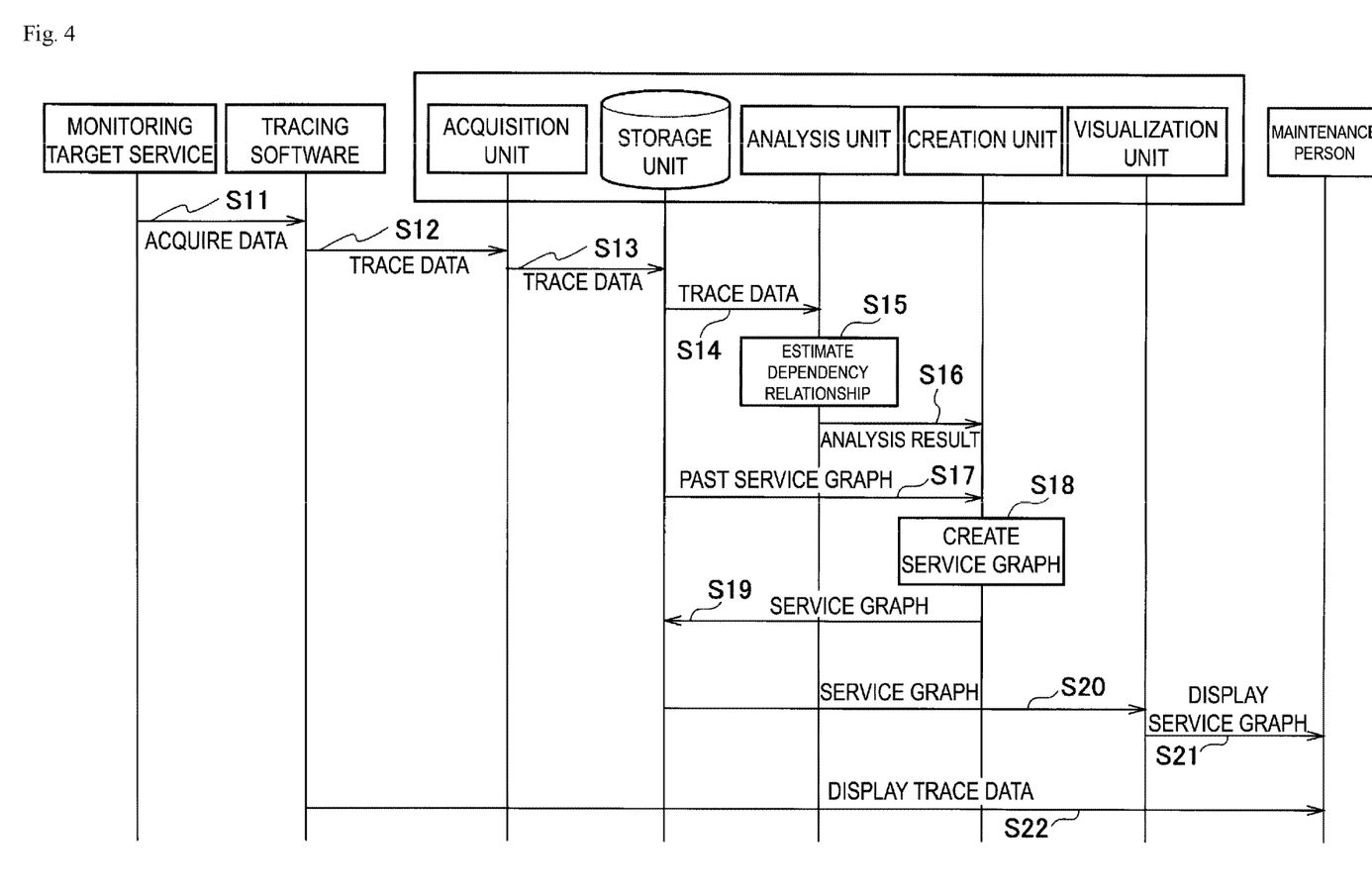
FIG. 4 is a sequence diagram illustrating an operation of a maintenance management system according to the present embodiment.

An operation of a maintenance management system according to the present embodiment will be described with reference to FIG. 4.

In step S11, the tracing software 30 acquires data from the monitoring target service 50 and generates trace data in a predetermined period.

In steps S12 and S13, the acquisition unit 11 acquires the trace data from the tracing software 30 and stores the trace data in the storage unit 12. The acquisition unit 11 may acquire the trace data from the tracing software 30 when a failure occurs in the monitoring target service 50, or may periodically acquire the trace data from the tracing software 30.

In steps S14 and S15, the analysis unit 13 reads the trace data from the storage unit 12 to estimate a dependency relationship between the components. Details of processing in which the analysis unit 13 estimates the dependency relationship will be described later.

In steps S16 and S17, the creation unit 14 receives the analysis result, that is, the dependency relationship between the components from the analysis unit 13, and reads a past service graph from the storage unit 12. If a new service graph is created, the processing of step S17 may be omitted.

In step S18, the creation unit 14 creates or updates a service graph. The generated service graph will be described in detail later.

In step S19, the service graph is stored in the storage unit 12.

In step S20, the visualization unit 15 reads the service graph from the storage unit 12 to visualize the service graph.

In steps S21 and S22, the maintenance person causes the service graph generation apparatus 10 to display the service graph, or causes the tracing software 30 to display the trace data and the service topology, to identify a location of a root cause and a failure range of the monitoring target service 50.

Figure 5:
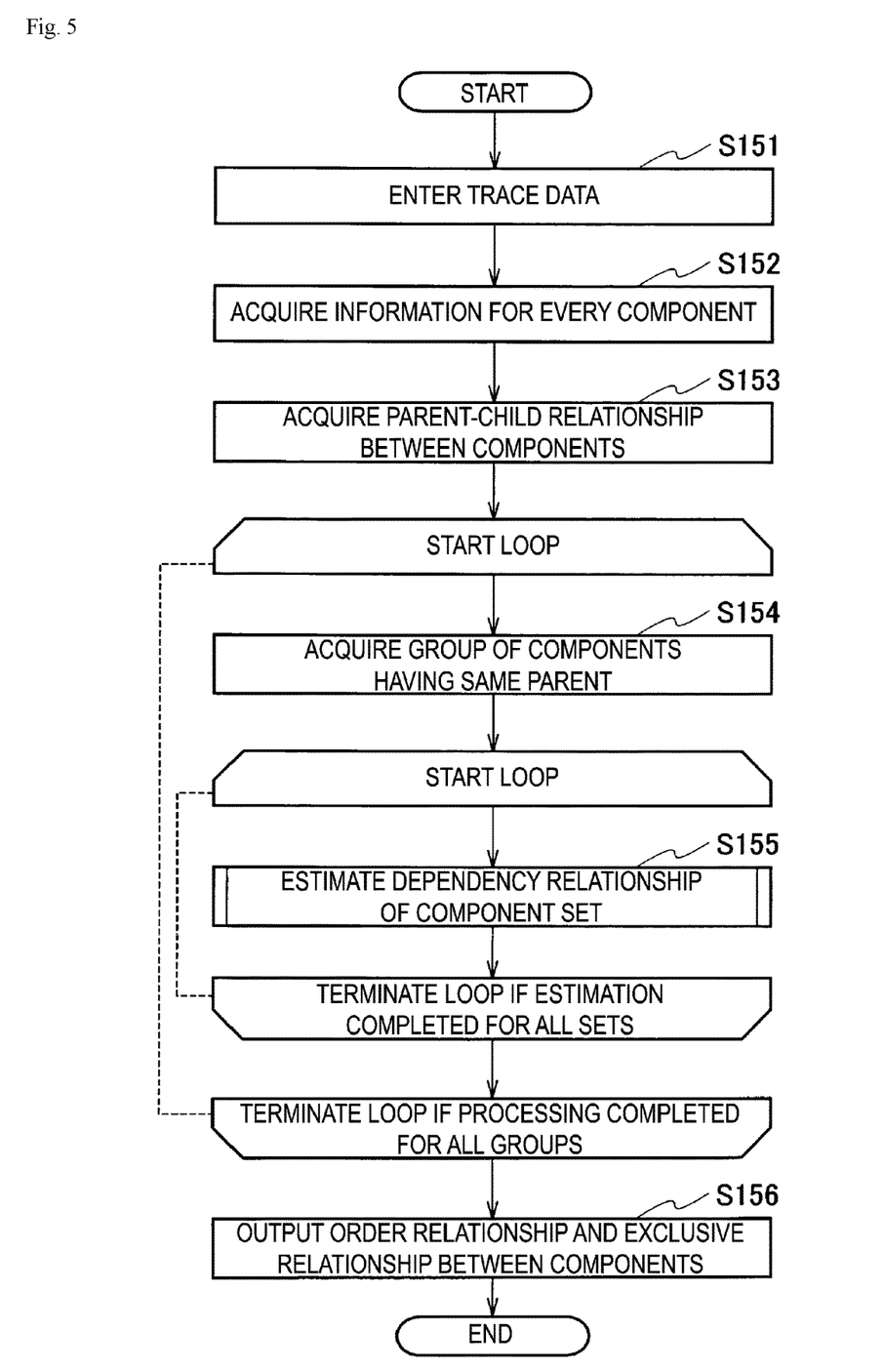
FIG. 5 is a flowchart illustrating a processing flow for estimating a dependency relationship.

Dependency relationship estimation processing by the analysis unit 13 will be described with reference to the flowchart of FIG. 5.

In step S151, the analysis unit 13 acquires trace data from the storage unit 12.

In steps S152 and S153, the analysis unit 13 analyzes the trace data for every component to obtain a parent-child relationship between the components. For example, a tree structure illustrating a parent-child relationship between components as illustrated in FIG. 3 is obtained. The spans explicitly record a component waiting for a response as a parent, and thus, the parent-child relationship between the components can be extracted from the spans. The analysis unit 13 may acquire the parent-child relationship between the components from the tracing software 30.

In step S154, the analysis unit 13 selects one group from a plurality of groups of sibling components. For example, in the example of FIG. 3, the component B, the component C, the component D, and the component E are all sibling components having the component A as a parent. In step S154, for example, a group including the four components B to E is selected.

In step S155, the analysis unit 13 compares time data included in the spans for all combinations of two components (a set of components) included in the obtained group, to estimate the order relationship and the exclusive relationship of the set of components. The dependency relationship estimation processing for the set of components will be described in detail later.

The analysis unit 13 estimates the dependency relationships for all combinations of the components included in the group, and then, the processing returns to step S154. The analysis unit 13 acquires the next group of sibling components, and estimates dependency relationships for all combinations of components included in the next group.

After processing all groups of the sibling components, the analysis unit 13 outputs, to the creation unit 14, in step S156, all sets of components having an order relationship and all sets of components having an exclusive relationship, as an analysis result. The analysis unit 13 also outputs a parent-child relationship to the creation unit 14.

Dependency relationship estimation processing for the set of components will be described with reference to the flowchart of FIG. 6.

In step S1551, the analysis unit 13 selects one set of components {a, b} from the group of sibling components. The analysis unit 13 refers to time data in spans of the selected set of components for every piece of trace data 1 to n as illustrated in FIG. 7, and executes processing of steps S1552 to S1557. It is assumed that the components B to E illustrated in FIG. 7 are sibling components each having a parent-child relationship with the component A.

In step S1552, the analysis unit 13 determines whether the spans of the set of components {a, b} overlap in a chronological order in any of the trace data 1 to n. For example, in the trace data 1 of FIG. 7, the component B and the component C do not overlap in the chronological order, but the component D and the component E do overlap in the chronological order.

If the components overlap in the chronological order, the analysis unit 13 updates, in step S1555, the dependency relationship of the set of components {a, b} to "no dependency relationship". For example, in the trace data 1, the component D and the component E overlap in the chronological order, and thus, the component D and the component E have no dependency relationship. If the dependency relationship between the components is determined, the analysis unit 13 terminates the processing for the set of components {a, b}. The analysis unit 13 returns the processing to step S1551 and selects the next set of components. When all combinations of the components in the group are processed, the dependency relationship estimation processing of a set of components is completed.

If the components do not overlap in the chronological order, the analysis unit 13 determines whether the spans are continuous in the order of a to b or b to a in the chronological order, in step S1553. For example, in the trace data 1 of FIG. 7, the processing of the component C is executed after the processing of the component B. It is assumed that the component B and the component C do not overlap in the chronological order in any of the trace data 1 to n.

If the spans are not continuous in the chronological order, the processing proceeds to NO in step S1553, and the analysis unit 13 does not update the dependency relationship of the set of components {a, b}. An initial value of the dependency relationship may be "no dependency relationship", or a dependency relationship obtained from a past analysis result may be set to the initial value.

If the spans are continuous in the chronological order, the analysis unit 13 determines, in step S1554, whether there are spans continuous in the reverse order of step S1553, that is, in the order of b to a or a to b in the chronological order. For example, in the example of FIG. 7, in the trace data 1, the component C is executed after the component B, and in the trace data 2, the component B is executed after the component C. In the set of the components B and C, the spans are continuous in any one of the order of the component B to the component C and the order of the component C to the component B in the chronological order.

If the spans of the set of components {a, b} are continuous in any order in the chronological order, the analysis unit 13 updates the dependency relationship of the set of components {a, b} to "exclusive relationship" in step S1556. In the example of FIG. 7, the analysis unit 13 defines the dependency relationship of the set of the components B and C as an "exclusive relationship".

If the spans of the set of components {a, b} are continuous in a determined order in the chronological order, the analysis unit 13 updates the dependency relationship of the set of components {a, b} to "order relationship of a→b (b→a)" in step S1557. For example, in the example of FIG. 7, the component D is executed after the component B in all of the trace data 1 to n. The analysis unit 13 defines the dependency relationship of the set of the components B and D as "order relationship of B→D".

Figure 6:
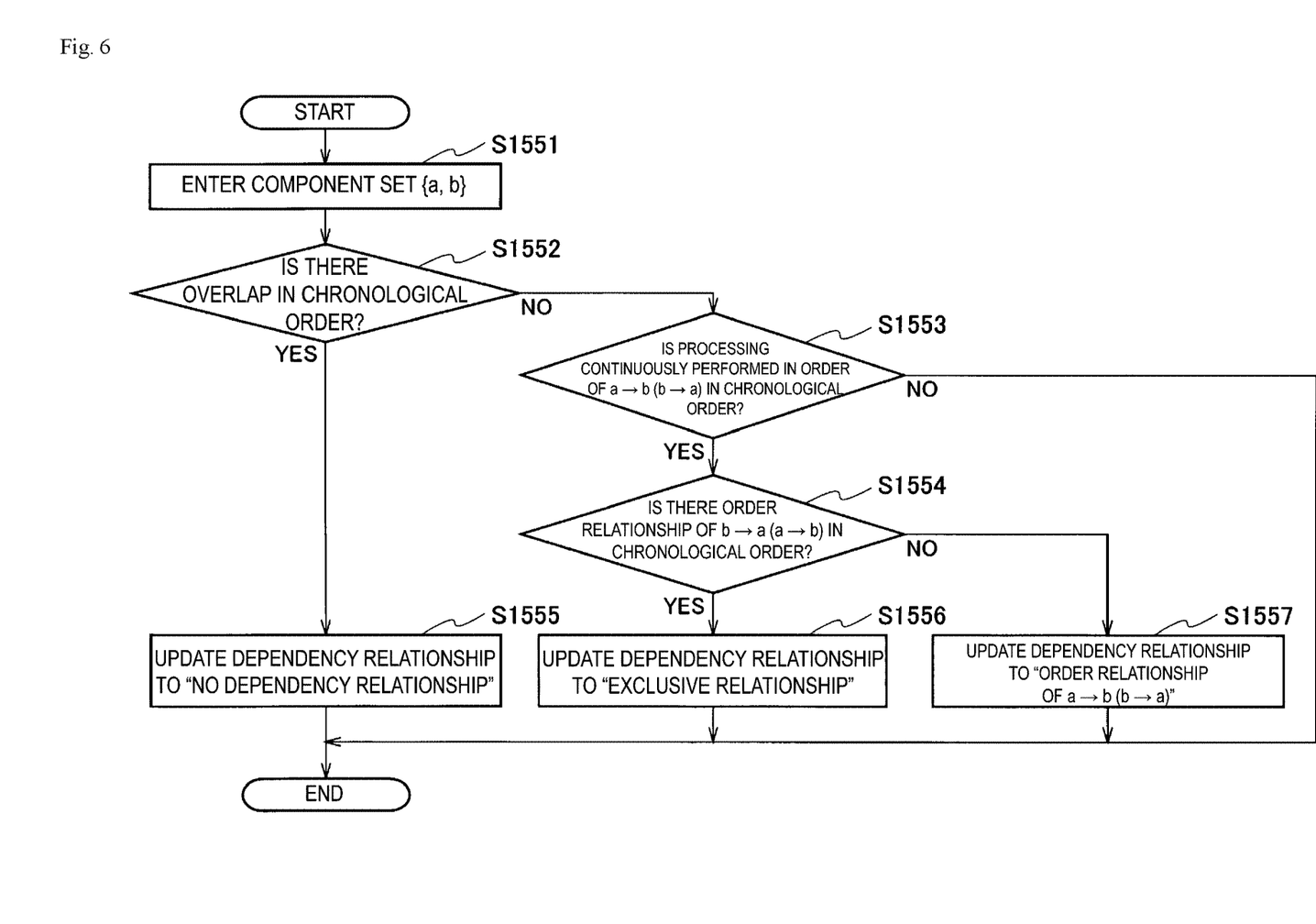
FIG. 6 is a flowchart illustrating a processing flow for estimating a dependency relationship of a set of components.
Figure 7:
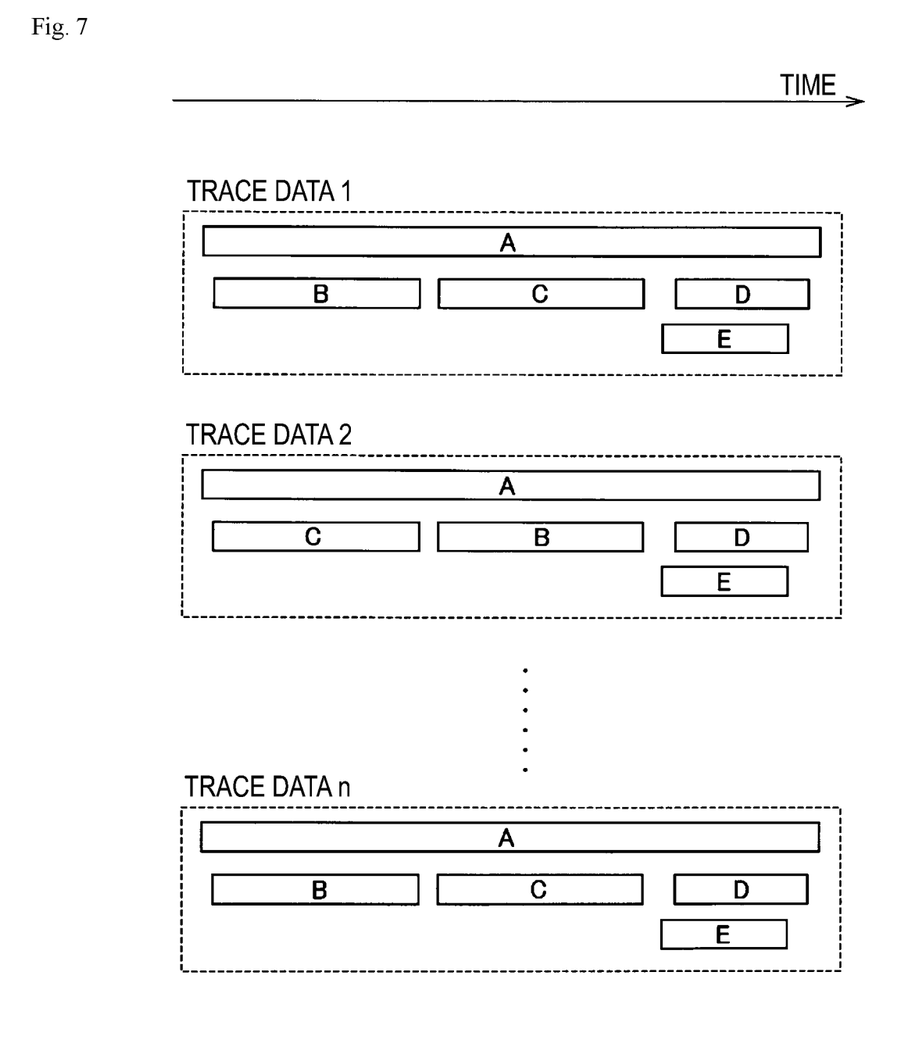
FIG. 7 is a diagram illustrating an example of trace data.

The processing of FIG. 6 is executed for all combinations of components in the group. Specifically, the processing is executed for a set of the component B and the component C, a set of the component B and the component D, a set of the component B and the component E, a set of the component C and the component D, a set of the component C and the component E, and a set of the component D and the component E. A dependency relationship between the components B, C, D, and E in the example of FIG. 7 will be described below.

The component B and the component C do not overlap in the chronological order in any of the trace data 1 to n. In the trace data 1, the spans are continuous in the order of the component B to the component C in the chronological order, and in the trace data 2, the spans are continuous in the order of the component C to the component B in the chronological order. Consequently, it is estimated that the component B and the component C are in an exclusive relationship in which the processing of the component B and the processing of the component C cannot be performed in parallel, regardless of the processing order.

The component B and the component D do not overlap in the chronological order in any of the trace data 1 to n. The spans may be continuous in the order of the component B to the component D, but not in the reverse order, in the chronological order. Consequently, the component D can start only after the component B is completed, and thus, it is estimated that the component B and the component D are in an order relationship.

The component D and the component E overlap in the chronological order in the trace data 1 to n. Processing of the component D and the processing of the component E can be performed in parallel, and thus, it is estimated that component D and the component E are not in a dependency relationship.

It is estimated that the component B and the component E, the component C and the component D, and the component C and the component E are all in an order relationship, similarly to the component D and the component B and the component D.

A method of expressing a service graph, based on a dependency relationship between components will be described with reference to FIGS. 8 to 11.

The service graph generation apparatus 10 represents a service graph at the component level of the entire monitoring target service 50 by a Petri net, based on the estimated dependency relationships. The Petri net is a directed bipartite digraph including two types of nodes called a place and a transition, and the place and the transition are connected by an arc. A variable called a token is applied to the place. When a transition fires, the transition moves tokens in all places existing before the transition to all places existing after the transition.

Figure 8:
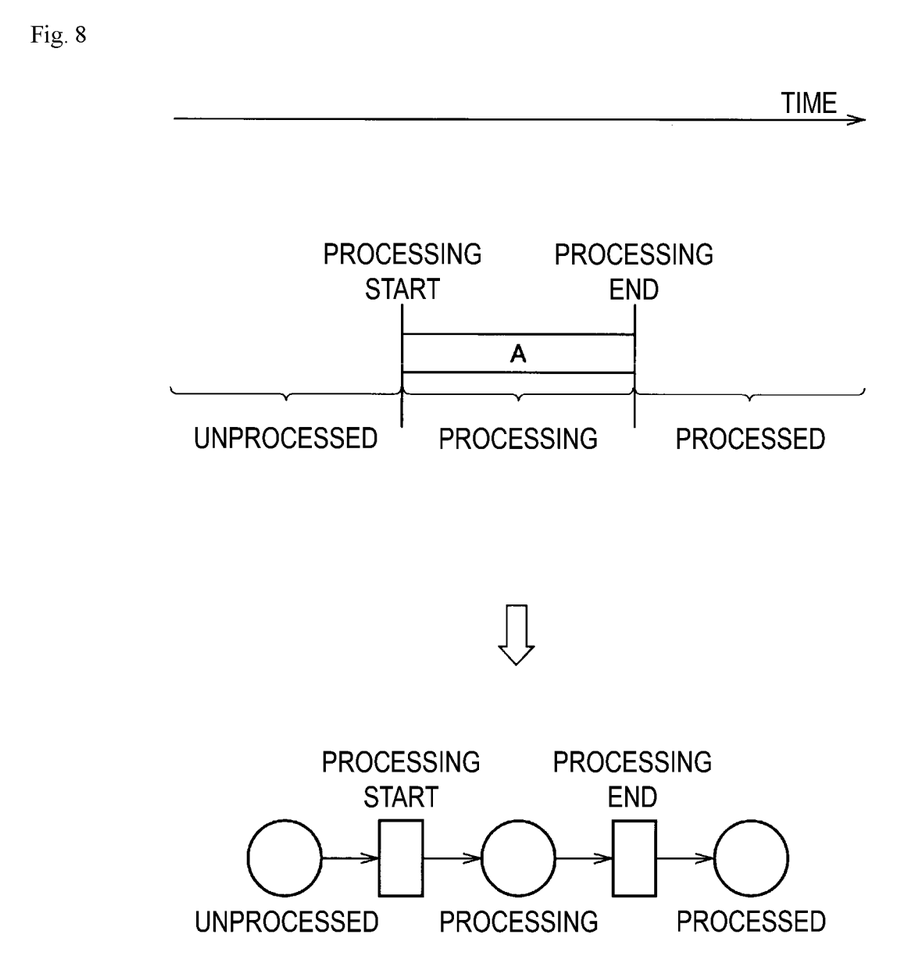
FIG. 8 is a diagram and a graphical representation representing a component using a Petri net.

In the present embodiment, a Petri net of one component is defined as shown in FIG. 8. Specifically, it is assumed that the component can take three types of states, that is, "unprocessed", "processing", and "processed", and these three types of states are each associated with a place. A state transition of a component is expressed if a token is moved by firing (a processing start or a processing end) of a transition provided between places. Although not illustrated in FIG. 8, a token may be represented by placing a black circle in a place.

A dependency relationship between components can be expressed by adding an arc and a place to the Petri net of the components shown in FIG. 8. Specifically, as shown in FIGS. 9 to 11, a parent-child relationship, an order relationship, and an exclusive relationship between components are expressed.

Figure 9:
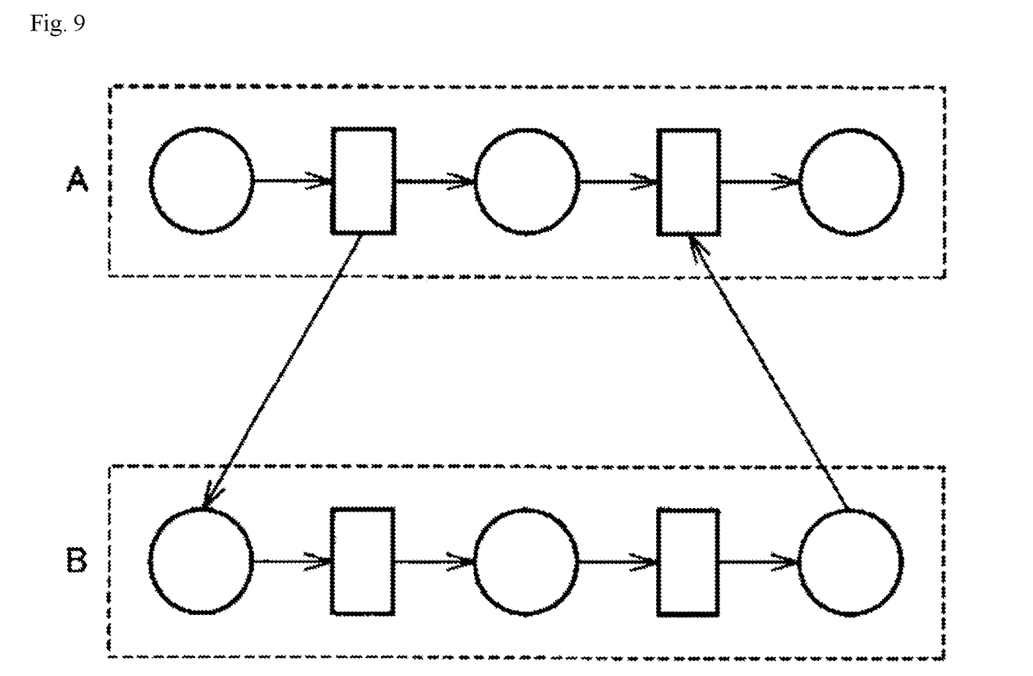
FIG. 9 is a graphical representation representing a parent-child relationship between components by a Petri net.

A parent-child relationship between the components A and B can be expressed as shown in FIG. 9. An arc is arranged from a transition of a processing start of the parent component A to an unprocessed place of the child component B, and an arc is arranged from a processed place of the child component B to a transition of a processing end of the parent component A. Thus, it can be expressed that, after the processing of the component A starts, the processing of the component B starts, and after the processing of the component B is completed, the component B is in a processed state, and then, the processing of the component A is completed.

Figure 10:
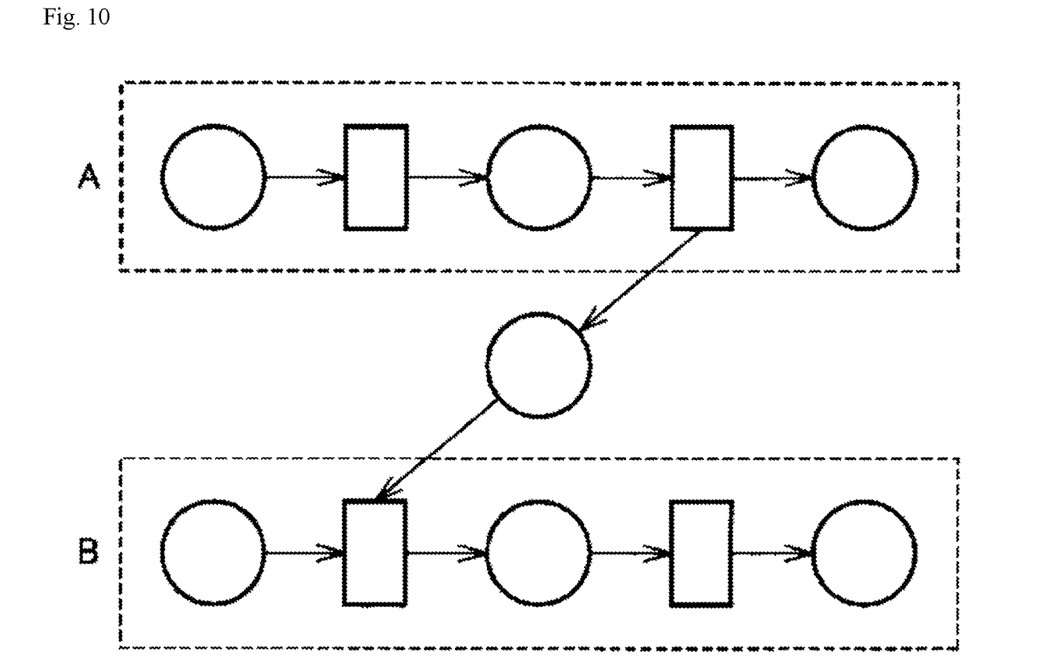
FIG. 10 is a graphical representation representing an order relationship between components by a Petri net.

An order relationship between the components B and D can be expressed as shown in FIG. 10. A new arc and place are arranged from a transition of a processing end of the component B, and an arc is arranged from the new place to a transition of a processing end of the component D. Thus, it can be expressed that, after the processing of the component B is completed, the processing of the component D starts.

Figure 11:
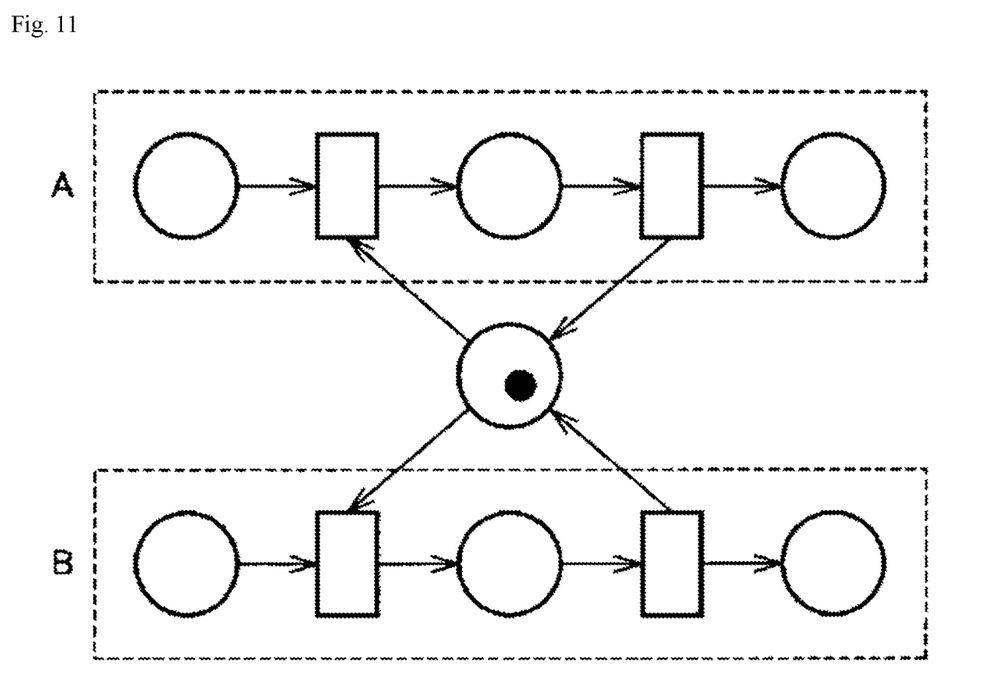
FIG. 11 is a graphical representation representing an exclusive relationship between components by a Petri net.

An exclusive relationship between the components B and C can be expressed as shown in FIG. 11. A new place indicating a state where both the component B and the component C are not being processed is arranged, and a token is arranged in the new place. Arcs are arranged from transitions of processing ends of the components B and C to the new place, and arcs are arranged from the new place to transitions of processing starts of the components B and C. Thus, it can be expressed that after the processing of the component B or the component C is completed, the processing of the component C or the component B starts.

The creation unit 14 adds, for a newly discovered dependency relationship between components, a graph expressing the dependency relationship, according to the above method, and deletes, for a lost dependency relationship, a part of a graph expressing the lost dependency relationship. The service graph can be updated simply by adding or deleting a part expressing a dependency relationship.

Figure 12:
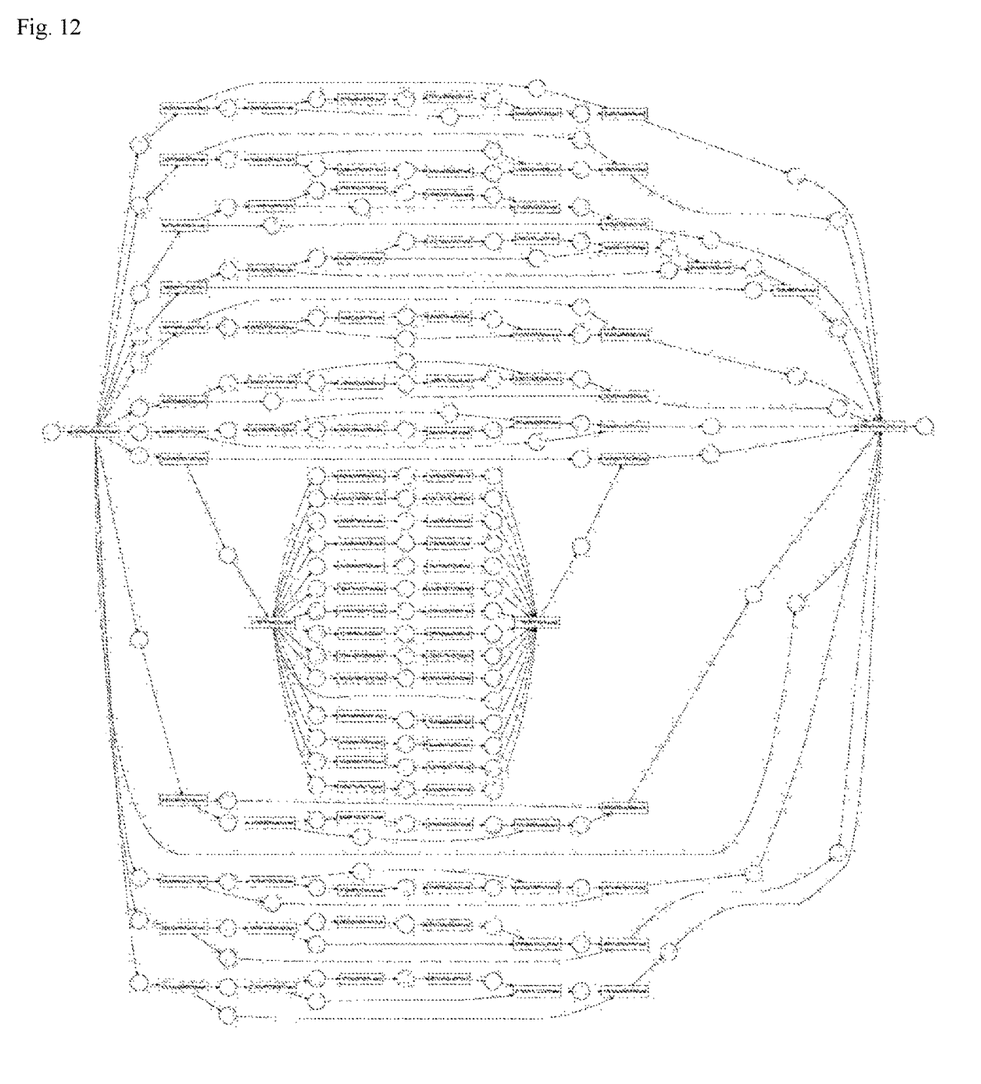
FIG. 12 is a graphical representation showing an example of a service graph.

FIG. 12 shows an example of a service graph. The service graph of FIG. 12 is obtained as follows. Jeager of NPL 1 is used for tracing of HotROD which is a sample application in NPL 1, and the service graph generation apparatus 10 generates the service graph from the trace data and displays the generated service graph. In the service graph of FIG. 12, all components constituting the service and dependency relationships between components are expressed. The maintenance person can follow components processing a request from an end user in a processing order, from a state on a left end to a state on a right end in FIG. 12, and can easily identify a location of a root cause and a failure range.

As described above, in the service graph generation apparatus 10 according to the present embodiment, the acquisition unit 11 acquires trace data including spans recording a parent-child relationship and time data of processing of components in a series of processing in a service, the analysis unit 13 compares, for every piece of the trace data, time data between spans of sibling components to estimate an order relationship or an exclusive relationship between the components, and the creation unit 14 creates a service graph expressing all components formed of the monitoring target service 50, and the parent-child relationship, the order relationship, and the exclusive relationship between the components. Thus, the order relationship and the exclusive relationship between components, which are not explicitly expressed in the trace data acquired by the tracing software 30, can be estimated and expressed as a service graph. As a result, it is easy to identify a location of a root cause and a failure range when a service failure occurs.

The service graph generation apparatus 10 according to the present embodiment expresses a state before, during, and after processing of a component as a place in a Petri net, expresses a processing start and a processing end of the component as a transition in the Petri net, and expresses a dependency relationship between components by arranging new nodes and arcs. Thus, the service graph generation apparatus 10 can easily add a newly estimated dependency relationship and delete an obsolete dependency relationship.

Figure 13:
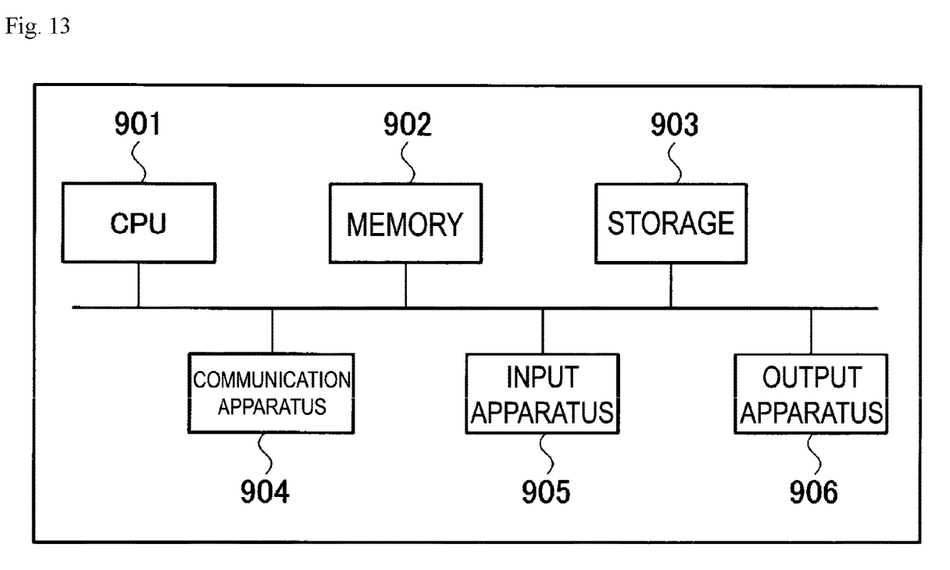
FIG. 13 is a diagram illustrating an example of a hardware configuration of the service graph generation apparatus.

As the service graph generation apparatus 10 described above, for example, a general-purpose computer system including a central processing unit (CPU) 901, a memory 902, a storage 903, a communication apparatus 904, an input apparatus 905, and an output apparatus 906 as illustrated in FIG. 13 may be used. In the computer system, the service graph generation apparatus 10 is realized by the CPU 901 executing a predetermined program loaded on the memory 902. The program can also be recorded on a computer readable recording medium such as a magnetic disk, an optical disc, or a semiconductor memory or can also be distributed through a network.

REFERENCE SIGNS LIST

10 . . . Service graph generation apparatus
11 . . . Acquisition unit
12 . . . Storage unit
13 . . . Analysis unit
14 . . . Creation unit
15 . . . Visualization unit
2 . . . Trace data
30 . . . Tracing software
50 . . . Monitoring target service

The invention claimed is:

1. A service graph generation apparatus for generating a service graph expressing a dependency relationship between a plurality of components constituting a service, the service graph generation apparatus comprising:
an acquisition unit, implemented using one or more computing devices, configured to acquire trace data including a plurality of spans recording a parent-child relationship and time data of processing of the plurality of components in a series of processing in the service;
an analysis unit, implemented using one or more computing devices, configured to (i) compare, for every piece of the trace data, time data between the plurality of spans of the plurality of components having an identical parent and (ii) estimate an order relationship or an exclusive relationship between the plurality of components; and
a creation unit, implemented using one or more computing devices, configured to create a service graph expressing all of the plurality of components constituting the service, and the parent-child relationship, the order relationship, and the exclusive relationship between the plurality of components.

2. The service graph generation apparatus according to claim 1, wherein the analysis unit is configured to estimate (i) that a plurality of components having processing times not overlapping between the plurality of spans and being continuously processed only in an identical order in a chronological order are in an order relationship and (ii) that a plurality of components having processing times not overlapping between the plurality of spans and being continuously processed in a different order in the chronological order are in an exclusive relationship.

3. The service graph generation apparatus according to claim 1, wherein the creation unit is configured to express (i) the plurality of component by a plurality of Petri nets and (ii) a dependency relationship between the plurality of components by arranging a new node and a new arc between the plurality of Petri nets of the plurality of components.

4. The service graph generation apparatus according to claim 3, wherein the creation unit is configured to express (i) states before, during, and after processing of the plurality of components as a plurality of places in the plurality of Petri nets and (ii) a processing start and a processing end of the plurality of components as transitions in the plurality of Petri nets.

5. A service graph generation method for generating a service graph expressing a dependency relationship between a plurality of components constituting a service, the service graph generation method performed by a computer and comprising:
acquiring trace data including a plurality of spans recording a parent-child relationship and time data of processing of the plurality of components in a series of processing in the service;
comparing, for every piece of the trace data, time data between the plurality of spans of the plurality of components having an identical parent and estimating an order relationship or an exclusive relationship between the plurality of components; and
creating a service graph expressing all of the plurality of components constituting the service, and the parent-child relationship, the order relationship, and the exclusive relationship between the plurality of components.

6. A non-transitory computer readable medium having stored thereon a program causing a computer to execute operations comprising:
acquiring trace data including a plurality of spans recording a parent-child relationship and time data of processing of a plurality of components in a series of processing in a service;
comparing, for every piece of the trace data, time data between the plurality of spans of the plurality of components having an identical parent and estimating an order relationship or an exclusive relationship between the plurality of components; and
creating a service graph expressing all of the plurality of components constituting the service, and the parent-child relationship, the order relationship, and the exclusive relationship between the plurality of components.

7. The non-transitory computer readable medium according to claim 6, wherein the operations further comprising estimating (i) that a plurality of components having processing times not overlapping between the plurality of spans and being continuously processed only in an identical order in a chronological order are in an order relationship and (ii) that a plurality of components having processing times not overlapping between the plurality of spans and being continuously processed in a different order in the chronological order are in an exclusive relationship.

8. The non-transitory computer readable medium according to claim 6, wherein the operations further comprising expressing (i) the plurality of component by a plurality of Petri nets and (ii) a dependency relationship between the plurality of components by arranging a new node and a new arc between the plurality of Petri nets of the plurality of components.

9. The non-transitory computer readable medium according to claim 8, wherein the operations further comprising expressing (i) states before, during, and after processing of the plurality of components as a plurality of places in the plurality of Petri nets and (ii) a processing start and a processing end of the plurality of components as transitions in the plurality of Petri nets.

* * * * *